United States Patent
Ayache et al.

(10) Patent No.: US 6,175,648 B1
(45) Date of Patent: Jan. 16, 2001

(54) PROCESS FOR PRODUCING CARTOGRAPHIC DATA BY STEREO VISION

(75) Inventors: Nicolas Ayache, Nice; David Canu, Orsay; Jacques Ariel Sirat, Buc, all of (FR)

(73) Assignee: Matra Systems et Information, Velizy Villacoublay (FR)

( * ) Notice: Under 35 U.S.C. 154(b), the term of this patent shall be extended for 0 days.

(21) Appl. No.: 09/132,488

(22) Filed: Aug. 11, 1998

(51) Int. Cl.$^7$ .................................................. G06K 9/00

(52) U.S. Cl. ....................... 382/154; 382/284; 382/294; 348/42; 348/48

(58) Field of Search ................................ 382/154, 153, 382/284, 106, 294, 293, 276; 345/139, 419, 424, 425, 427; 356/12, 2, 375–376, 390, 147; 348/42–48, 36, 51, 135, 159; 359/462, 618; 706/16

(56) References Cited

U.S. PATENT DOCUMENTS

| | | | |
|---|---|---|---|
| 5,179,441 | * 1/1993 | Anderson et al. | 348/43 |
| 5,383,013 | * 1/1995 | Cox | 356/2 |
| 5,727,078 | * 3/1998 | Chupeau | 382/154 |
| 5,818,959 | * 10/1998 | Webb et al. | 382/154 |
| 5,867,591 | * 2/1999 | Onda | 382/154 |
| 5,911,035 | * 6/1999 | Tsao | 706/16 |
| 6,046,763 | * 4/2000 | Roy | 348/47 |

OTHER PUBLICATIONS

Dudgeon et al., Smoothing Algorithm for 3D Surface, IEEE, 524–528, 1993.*
van Beek et al., A Parallel Algorithm for Stereo Vision, IEEE, 251–256, 1996.*
Tsai, Multiframe Image Point Matching 3–D Surface Reconstruction, IEEE, 159–174, 1993.*
Jones G A: "Constraint, Optimization, and Hierarchy: Reviewing Stereoscopic Correspondence of Complex Features" Computer Vision and Image understanding, vol. 65, No. 1, janvier 1997, pp. 57–78, XP000685839 * p. 57, colonne de gauche, ligne 10—colonne de droite, ligne 3 * * p. 59, colonne de gauche, ligne 32—p. 61, colonne de droite, ligne 2 *.
Kang S B et al: "A Multibaseline Stereo System With Active Illumination and Real–Time Image Acquisition" Proceedings of the Fifth International conference On Computer Visio, Cambridge, MA., Jun. 20–23, 1995, No. Conf. 5, 20 juin 1995, Institute of Electrical and Electronics Engineers, pp. 88–93, XP000557054 * p. 89, colonne de droite, ligne 3—ligne 28; figure 4 *.

* cited by examiner

Primary Examiner—Leo H. Boudreau
Assistant Examiner—Ishrat Sherali
(74) Attorney, Agent, or Firm—Larson & Taylor, PLC

(57) ABSTRACT

The method produces three dimensional cartographic data of a scene from n two-dimensional images of the scene, n being an integer higher than 2. The images are delivered by n respective detectors seeing the scene from different points of view. In a first step, each detector i is calibrated for estimating parameters identifying n affine models $F_i$ (x, y, z) each defining a relation between coordinates x, y, z of any point in the scene and coordinates $(p, q)_i$ of a projection of said any point in an image i among said n images. Each of (n−1) couples of images, (each couple consisting of a same reference image selected among said n images) is matched, each match being made by searching an homolog of each of pixels or zones constituting the reference image along a corresponding epipolar line of the other image of the couple. In each couple of two images, each comprising one reference image, and for each pixel or each zone of the reference image, a curve plotting a degree of similarity as a function of disparity along the epipolar line of the other image of the couple is prepared. All curves are brought into a common reference frame for matching a maximum number of images. All curves are summed and the highest peak is retained. The coordinates x, y, z of each point are derived from the disparity of the retained peak and from the parameter of the n models $F_i$ (x, y, z).

6 Claims, 3 Drawing Sheets

PROCESS FOR PRODUCING CARTOGRAPHIC DATA BY STEREO VISION

BACKGROUND OF THE INVENTION

The present invention relates to processes for producing cartographic data in three dimensions from n two-dimensional images of a scene, provided by n sensors having different points of view of the scene.

It has for a very long time been known to define the position in space of structures which are present in a scene and can be seen in two images taken under different viewing angles, using stereoscopic techniques. This process has been generalized to the case of n images, n being an integer greater than 2, these n images constituting a stereoscopic system having a plurality of baselines.

Processes which include the following steps are, in particular, known:
  the n sensors are calibrated (by using 3D knowledge of their relative position with respect to the scene which is observed and/or pattern recognition processes, so as to provide parameters of n models $F_i(x,y,z)$, each defining the relationship between a point in the scene, with coordinates x,y,z, and the coordinates $(p,q)_i$ of its projection into each of the n images, for i ranging from 1 to n;
  the n images are set in correspondence, so as to locate the coordinates of the projection in the images of the same point in three-dimensional space;
  3D reconstruction is performed, consisting in obtaining the coordinates x, y and z of the 3D point corresponding to each match between images, on the basis of knowledge of the models $F_i$, and the matched image points.

A process of this type is described in the article by Sing Bing Kang et al. "A Multibaseline Stereo System with Active Illumination and Real-time Image Acquisition", Proceedings IEEE Int. Conf. on Computer Vision, pages 88–93, June 1995. The process proposed in this article employs four cameras whose optical axes converge approximately at the same point. The image provided by one of the cameras is chosen as a reference. Given that the axes of the cameras are not parallel, the associated epipolar lines are not parallel to the image lines. In order to simplify recovery of the altitude from the stereoscopic images, that is to say 3D reconstruction, the images are subjected to rectification which converts each original pair of images into another pair such that the epipolar lines resulting therefrom are parallel, equal and coincident with image scanning lines. The correspondence method uses a variable $\lambda$, defined as the distance from the optical centre along the viewing axis passing through the optical centre of the reference camera and the point in question, in order to calculate the search zone for potential homologues in the images to be matched with the reference image. Use of this variable $\lambda$ inevitably leads to a model with non-linear transition between the images, which makes the calculations more complicated. The strategy taught by the article, consisting in assigning equal significance to each pair, is a source of error whenever points are masked in one or more of the images.

A detailed study of algorithms for merging a plurality of representations in order to recover 3D cartographic data from a plurality of 2D images of a scene is given in the thesis at the Université de Paris Sud, Centre d'Orsay, May 1988 "Construction et Fusion de Representations Visuelles 3D: Applications à la Robotique Mobile" [Constructing and Merging 3D Visual Representations: Applications in Mobile Robotics] by N. Ayache.

SUMMARY OF THE INVENTION

An object of the present invention is to provide a process for producing cartographic data which is improved, in particular in that it makes it easier to establish multi-pair correspondence of n images (n being an integer greater than 2) and is flexible enough to adapt readily to a number of fields, such as:
  detection of obstacles and autonomous guidance of a mobile robot in a fixed scene,
  3D modelling of real sites,
  mapping,
  aerial reconnaissance, for obtaining a terrain profile,
  the modelling of optimum trajectories during the preparation of an air mission.

To this end, the process uses in particular the observation that, irrespective of the nature of the sensors (pinhole, linear array of photodetector sites, scanning sensor) and their relative position when the images are being acquired (on condition that they are stereoscopic and that there is overlap between a plurality of images) it is always possible to find n−1 resemblance curves, each corresponding to a pair of images including a same reference image, as a function of the disparity, defined in an arbitrary one of the pairs. To do this, a change of reference frame of the resemblance curves is performed, which can always be done with an affine model for changing from the disparity of one pair to that of another pair.

It will in general be possible to liken the disparity to the curvilinear abscissa of one point relative to another along the epipolar line; it can be measured as a number of pixels in the frequent case of an image represented by elementary points which are each assigned at least one radiometric value (luminance and/or chrominance).

The invention provides, in particular, a process for producing cartographic data in three dimensions from n two-dimensional images of the scene, which are provided by n sensors with different points of view, n being an integer greater than 2, comprising the steps of:
(a) calibrating each sensor of order i in order to estimate the parameters of n models $F_i(x,y,z)$ defining the relationship between the coordinates x,y,z of a point in the scene and the coordinates $(p,q)_i$ of its projection into the image i among the n images;
(b) matching each of the n−1 pairs of images, all including the same reference image chosen from among the n images, by looking for the homologue of each pixel or zone in the reference image along the corresponding epipolar of the other image in the pair;
(c) in each of the n−1 pairs of two images, each comprising one reference image, and for each pixel or zone in the reference image, establishing a resemblance curve (curve of variation of a similarity index) as a function of the disparity along the epipolar of the other image;
(d) bringing all curves into a common reference frame using a model, for example an affine model, in order to match the largest possible number of images;
(e) summing the curves, while possibly removing each peak located at a singular disparity relative to those of all the other curves, and adopting the highest peak of the resultant curve; and
(f) computing the coordinates x,y,z from the disparity of the adopted peak and the parameters of the n models $F_i(x,y,z)$.

It is also possible to calculate a plurality of disparity images while taking different images as a reference. The merging may be carried out after having calculated the coordinates in three dimensions; it may also be carried out at the disparity image level, this being an advantageous solution when the sensors are calibrated in a projective space.

The results of multipair correspondence or matching may be merged using a majority vote, by assigning a higher weighting coefficient to the peaks corresponding to the points of view most distanced from the reference image.

The process which has just been described makes it possible, in most cases, to alleviate the difficulties encountered in order to be certain to find the homologue of a point of the image in one or more other images. The use of a number n greater than 2 makes it possible to avoid the consequences of occultation in one or more images. The geometrical coherence of the multiple matches reduces the errors and removes ambiguities. The presence of images having similar points of view makes it possible to process images which resemble one another and have little occultation between them; the use of images having distant points of view makes it possible to obtain accurate 3D information.

The abovementioned characteristics, as well as others, will become more clearly apparent on reading the following description of particular embodiments of the invention, which are given by way of non-limiting example. The description refers to the accompanying drawings.

DETAILED DESCRIPTION

The general architecture of the process, which is retained irrespective of the application, will be described first before envisaging particular cases. For simplicity, those parts of the process according to the invention which are already well known will be recalled only briefly, and reference may be made to the documents already mentioned, as well as to the following:

As regards the simple case of sensors of the pinhole type, all of which are identical, providing images acquired in coplanar positions at the same altitude, to the article by R. Y. Tsai "Multiframe Image Point Matching and 3-D Surface Reconstruction" IEEE Transactions on Pattern Analysis and Machine Intelligence, PAMI-5, No. 2, pages 159–164, March 1983;

As regards mapping from calibrated digital aerial image maps, to the article by L. Gabet et al. "Construction Automatique de Modèle Numérique de Terrain à Haute Résolution en Zone Urbaine" [Automatic Digital Terrain Model Construction with High Resolution in an Urban Area], Bul. SFPT No. 135, pages 9–25, 1994.

The contents of such documents are included in the specification by reference.

A process according to the invention has three essential phases:

calibrating the sensors (step (a) above), setting the images in correspondence, or matching the images, involving merging at least n multipair correspondence results, these results being the disparity maps obtained directly or the digital elevation models (DEM) calculated therefrom, 3D reconstruction (step (f)).

These three phases will be described in succession.

Calibration

The purpose of calibrating the sensors is to provide an estimate of the parameters of the models $F_i(x,y,z)$ and $F_j(x,y,z)$ which define the relationship between the coordinates x,y,z of a 3D point in the scene and the 2D coordinates (p,q) of its projection into the image plane, respectively $\pi_1$ and $\pi_i$.

Figure 1:
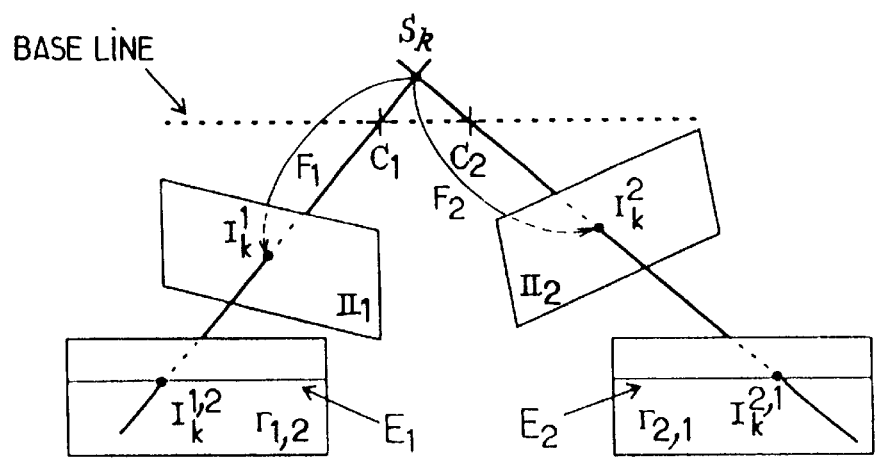
FIG. 1 is a diagram representing one possible arrangement of the sensors and showing the role of the rectification.

The process requires prior calibration of the sensors. In the simple case of just two sensors, which is illustrated in FIG. 1, the purpose of the calibration is to estimate the parameters of the models $F_1(x,y,z)$
$F_2(x,y,z)$ which define the relationship between a point $S_k$ in the scene, defined in three dimensions by its coordinates x, y and z and the coordinates $(p,q)_i$ of its projection into the image plane $\pi_i$ (with i=1 or 2).

The calibration is performed differently according to the nature of the sensors, using known processes, for example the method described in the article by Ayache mentioned above. It is possible to use correspondences between homologous points in the images, defined manually or obtained by pattern recognition techniques related to neighbourhoods.

The conclusion of this step provides the set of models $F_i(x,y,z)$ with $i \in \{1, \ldots, n\}$ and search directions for the corresponding points, these being those of the epipolars.

However, when calibration is carried out without initial 3D knowledge of the scene, the 3D reconstruction can be defined, when conventional methods are used, only to within a projective transformation of the 3D projective space. It will be seen below that the multipair process according to the invention is independent of the geometry and makes it possible to accommodate the altitude variations in the scene.

Multipair Correspondence

Figure 2:
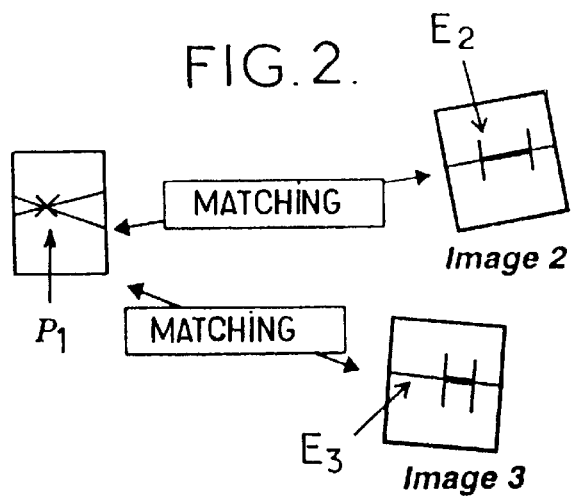
FIG. 2 shows the principle of the matches of a point by searching along epipolar portions.
Figure 3:
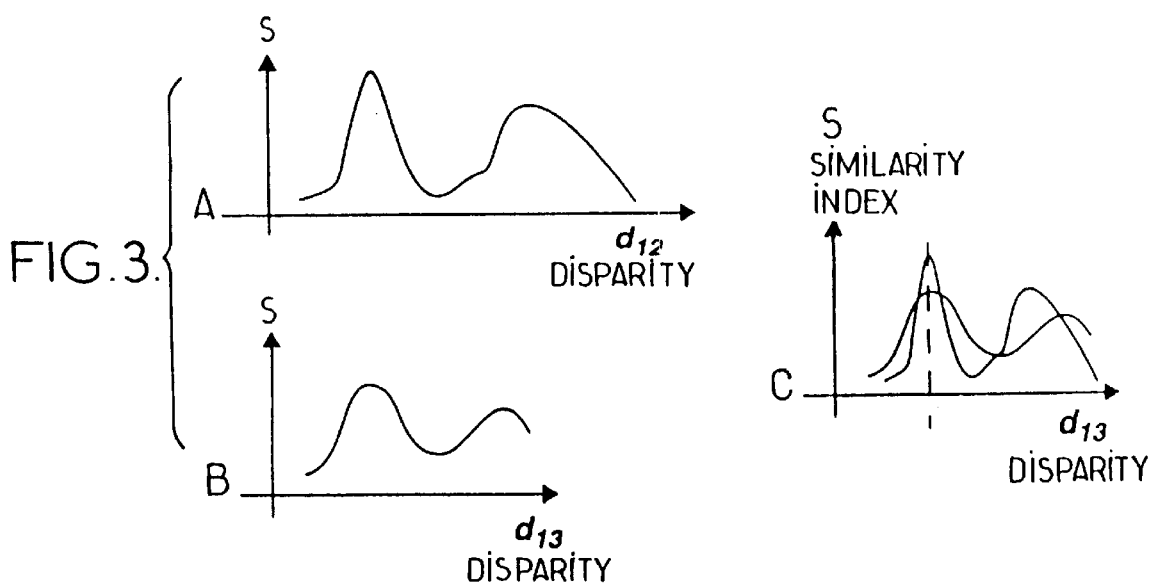
FIG. 3 shows examples of curves of variation of a resemblance index as a function of the disparity.

The images are matched by looking for the homologue of each point P of a reference image, generally defined with its neighbourhood in the form of a label, along the epipolars $E_2$, $E_3$, ... of the other images (FIG. 2). To this end, similarity curves are established as a function of the disparity $d_{12}$, $d_{13}$, ... (lines A and B). The similarity index S may, in particular, be a cross-correlation coefficient or a resemblance index pertaining to contours or regions. All the curves are then transformed into a common reference frame, for example $d_{13}$, which will outline probable matching with a sub-pixel accuracy corresponding to the coincidence of the peaks (line C in FIG. 3).

A change of reference frame is necessary if it is desired to express all the curves in the same frame for later merging them; this uses an affine model developed on the basis of the geometry with which the images are acquired. This model is of the following form, for an example involving three images in all:

$$d_{13}=a(\eta,\mu)d_{12}+b(\eta,\mu)$$

where d denotes the disparity, $\eta$ and $\mu$ denote the parameters which define the geometry of the pairs (1,2) and (1,3) for a position p on the epipolar of the primitive (point, contour or region) to be matched in image 1.

When the calibration is carried out without 3D knowledge of the scene, the coefficients $a(\eta,\mu)$ and $b(\eta,\mu)$ of the affine model are calculated by using rectification of the images, this being intended to convert each pair of plane 2D images into another pair such that the epipolar lines are parallel and coincident with the image lines or columns, as indicated in FIG. 1 where the rectified conjugate epipolars are indicated in the virtual retinal planes $\Gamma_{1,2}$ and $\Gamma_{2,1}$ for the points $I^1_k$ and $I^2_k$ in the image planes $\pi_1$ and $\pi_2$. The rectification facilitates the correspondence by making it possible to establish the curves in FIG. 3 immediately.

By way of example, it may be indicated that the transformation model $(p,q)=F_t(x,y,z)$ for a pinhole model is, in projective coordinates, a linear function of the form:

$$\tilde{u}=P\tilde{x}$$

$$\text{with } \tilde{u} = \begin{bmatrix} wp \\ wq \\ w \end{bmatrix} \text{ And } \tilde{x} = \begin{bmatrix} sx \\ sy \\ sz \\ s \end{bmatrix}$$

P is a 3×4 matrix defined to within a multiplicative factor; w and s are multiplicative factors.

In order to determine the matrix, it is necessary to have 11 parameters. These can be determined on condition that at least six homologous points are available.

If just two images are considered, it is possible to define a model for transition from a 3D point in the scene to the coordinates of its projection into each of the rectified images 1 and 2; the perspective projection matrices M and N for image 1 and image 2 defining the transition models are:

$$\vec{u}_1 = M\vec{x}$$

$$\vec{u}_2 = N\vec{x}$$

In order to calculate the coefficients of the matrixes M and N, to within a scale factor, it is necessary to satisfy a number of constraints:

parallel epipolar lines in the two images (epipoles at infinity);

for any arbitrary 3D point $S_k$ not belonging to the focal plane of the cameras defined after rectification, identical ordinates of the pixels, represented by the points $I_k^{1,2}$ and $I_k^{2,1}$ (FIG. 1);

coordinates of the optical centres $C_1$ and $C_2$ that are invariant in terms of the rectification.

The equations to which these constraints lead are given in the Ayache document mentioned above.

A solution to these equations can be found so as to limit the distortions to the rectified images. By way of example, the following expressions are given for the matrices M and N:

$$M = \begin{bmatrix} \alpha(t \wedge c_1)^T & 0 \\ \beta(c_1 \wedge c_2)^T & 0 \\ ((c_1-c_2) \wedge t)^T & c_1^T(c_2 \wedge t) \end{bmatrix}$$

-continued $$N = \begin{bmatrix} \alpha(t \wedge c_2)^T & 0 \\ \beta(c_1 \wedge c_2)^T & 0 \\ ((c_1-c_2) \wedge t)^T & c_1^T(c_2 \wedge t) \end{bmatrix}$$

where:

$c_1$ and $c_2$ are the vectors of the 3D coordinates of the optical centres $c_1$ and $c_2$ of the pinhole cameras;

$\alpha$ and $\beta$ are scale factors, conditioning the deformation of the rectified images in the direction of the epipolars, on the one hand, and in the orthogonal direction, on the other hand (if the epipolars after rectification are chosen to be horizontal);

f is a vector dictating the orientation of the rectification plane (making it possible to limit the distortions to the rectified images).

The projective geometry also makes it possible to calculate the matrices M and N by means of the fundamental matrices. A description of a posible approach of this type will be found in the thesis of Ecole Polytechnique "Vision stéréoscopique et propriétés différentielles des surfaces" [Stereoscopic Vision and Differential Surface Properties] by F. Devernay.

The matrices for passing from the actual (or acquired) images to the rectified images can be deduced from the matrices M and N, for example in the manner indicated by the Ayache document.

It is then necessary to define an inter-disparity model by its coefficients $a(\lambda,\mu)$ and $b(\lambda,\mu)$ such that:

$$d_{13}(p)=a(\eta,\mu) \cdot d_{12}+b(\eta,\mu)$$

This model makes the transfer from the disparity $d_{12}(p)$ of point p in the pair of rectified images 1 and 2 to the disparity $d_{13}(p)$ in the pair formed by the images 1 and 3. $\eta$ denotes the pair of images (1, 2) and $\mu$ denotes the pair of images (1, 3).

The parametric equations of the lines of sight in camera 1, which are defined on the basis of the coordinates of the pixel p in the rectified image in the $\eta$ pair geometry and in the $\mu$ pair geometry are:

$$\vec{x} = c_1 + \lambda_1^\eta t_\eta$$

and $$\vec{x} = c_1 + \lambda_1^\mu t_\mu$$

where $\vec{x}$ denotes the 3D coordinates of a point $c_1$ (coordinates of the optical centre of camera 1) and $t_\eta$ and $t_\mu$ are the director vectors defined simply as a function of the terms in the matrix M:

$$t_\eta = \epsilon_\eta (m_1^\eta - p_1^\eta m_3^\eta)^\wedge (m_2^\eta - q_1^\eta m_3^\eta)$$

$$t_\mu = \epsilon_\mu (m_1^\mu - p_1^\mu m_3^\mu)^\wedge (m_2^\mu - q_1^\mu m_3^\mu)$$

where $\epsilon$ denotes a standardization coefficient for the vector t.

It can be deduced therefrom that $\lambda_1^\eta = \tau^{\mu,\eta} \cdot \lambda_1^\eta$ with $\tau^{\mu,\eta} = (t_\eta^T \cdot t_\mu)/\Box t_\eta \Box$ The expressions for a and b can be deduced therefrom directly $$a(\eta, \mu) = \frac{k_1^\mu \cdot \tau^{\mu,\eta}}{k_1^\eta}$$

$$b(\eta, \mu) = k_2^\mu - \frac{k_1^\mu}{k_1^\eta} k_2^{<\eta} \cdot \tau^{\mu,\eta}$$

The simple, particular case in which the sensors are of the pinhole type will again be considered. The multipair matching can be carried out by the approach schematically represented in FIG. 4, in the case of four real images, numbered 1, 2, 3 and 4. After rectification, a point P in image 1 which is taken as the reference will be looked for on the corresponding epipolars of images 2, 3 and 4. Using the notation shown in FIG. 4, the multipair matches are made between the images $g_i$ and $d_i$, with $$i \in \{1,2,3\}$$

The coefficients a and b of the affine model for transition from the disparity of one pair to the disparity of another pair can be expressed simply as a function of the position of the pixel P to be matched, the geometry of the original pair and that of the destination pair.

Figure 4:
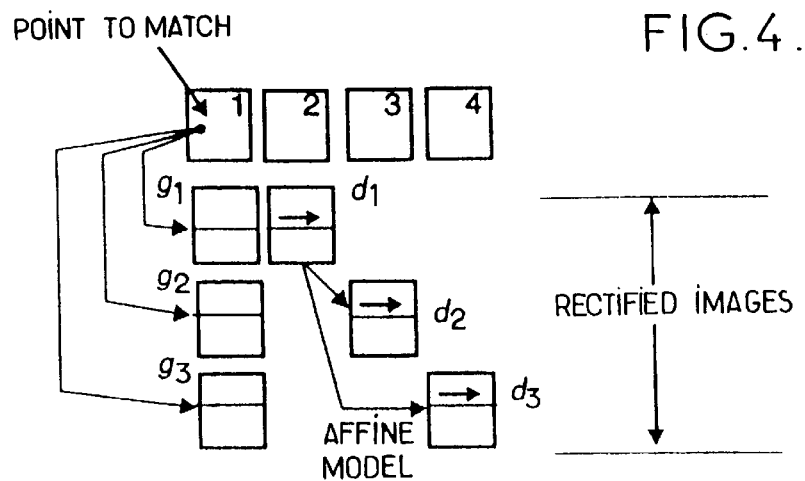
FIG. 4 represents an example of a diagram for treating images in view of multi-image matching.
Figure 5:
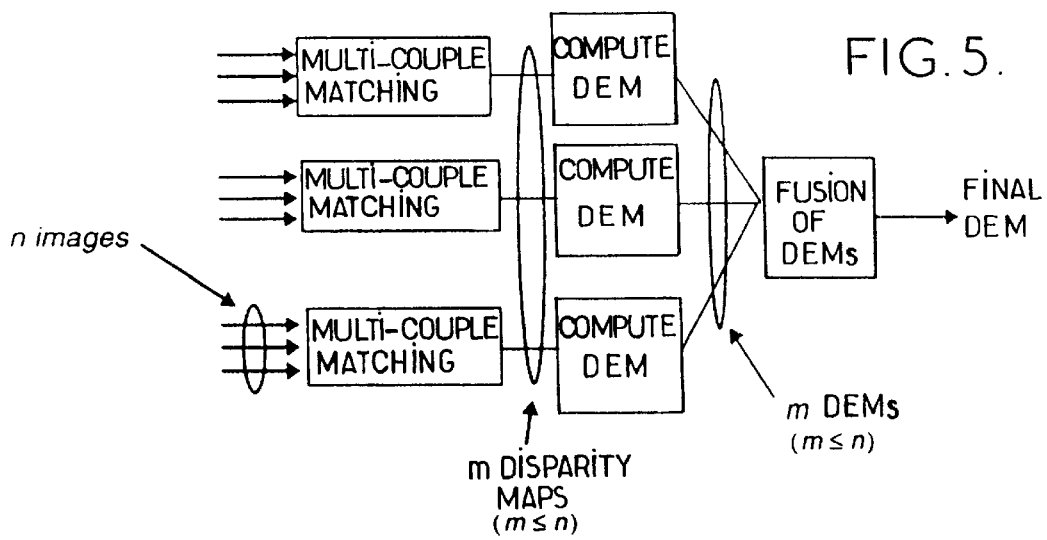
FIG. 5 shows a merging process for the multi-image processing.

As indicated above, the matches of the obtained set are then merged by taking n different images as reference (n=4 in the case of FIG. 4). This operation can be performed after having calculated the digital terrain models (DTM) or digital elevation models (DEM), as indicated in FIG. 5. However, it may be performed by merging the disparity maps, in order to obtain a final disparity map, before determining the final DEM.

Preferably, merging is carried out on the principle of majority votes or selection of a median value. Weighting is used when the votes are taken. This is calculated by assigning a maximum weight to the points of view most distant from the reference image.

Figure 6:
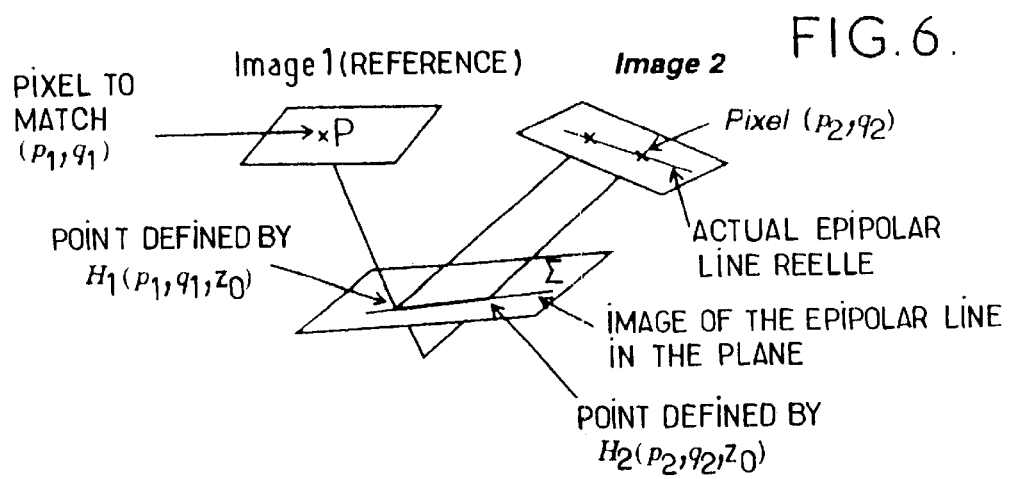
FIG. 6 shows one way of referencing resemblance curves with respect to a plane.

When the geometry of the sensors is known (pinhole, scanner or linear array model), a few indications will be given regarding the corresponding or matching method in the case of two images 1 and 2, image I being the reference image. The notation is that in FIG. 6. The referencing takes account of a plane $\Sigma$ at a constant altitude $z=z_0$. The functions $F_i$ are known and, in the case of pinhole models, are the perspective projection matrices $M_i$. It is consequently always possible to express the coordinates (p,q) in two dimensions in the plane $\Sigma$ for $z=z_0$ on the basis of two pixels $(p_1,q_1)$ and $(p_2,q_2)$ set in correspondence in the images 1 and 2.

If $(x_1, y_1)$ is the point in the plane $\Sigma$ which is the image of the pixel $(p_1,q_1)$ to be matched in image 1, and $(x_2,y_2)$ is the image of the pixel $(p_2, q_2)$ in image 2, then the disparity associated with this potential match is defined as the Euclidian distance in the plane $\Sigma$ between points $(x_1,y_1)$ and $(x_2, y_2)$ $$d_{12}(x_1, y_1) = \sqrt{(x_1 - x_2)^2 + (y_1 - y_2)^2}$$

On the basis of this definition of the disparity, calculation shows that the disparity in a pair of images (1, 2) can be expressed in the form:

$$d_{12}(x_1, y_1) = \sqrt{(a_n - a_m)^2 + (c_n - c_m)^2} \cdot (z_0 - z)$$

where $a_n$, $a_m$, $c_n$ and $c_m$ are the coefficients which can be deduced from the linear systems which, for constant $z_0$, connect p and q and the vector $\vec{m}$ defined above in each image.

In the case of the images 1 and 3, the following relationship would similarly be obtained:

$$d_{13}(x_1, y_1) = \sqrt{(a_p - a_m)^2 + (c_p - c_m)^2} \cdot (z_0 - z)$$

where $a_p$ and $c_p$ play the same role as $a_n$ and $c_n$. The linear model for inter-disparity transition between the pair $\eta$ of images (1, 2) and the pair $\mu$ of images (1, 3), when the plane $\Sigma$ is specified, can be written very simply in the form:

$$d_{13}(x_1, y_1) = a(\eta,\mu) \cdot d_{12}(x_1, y_1)$$

with $$a(\eta, \mu) = \frac{\sqrt{(a_p - a_m)^2 + (c_p - c_m)^2}}{\sqrt{(a_n - a_m)^2 + (c_p - c_m)^2}}$$

Using a calculation which may be performed in parallel, it is thus possible to establish all the similarity curves with a view to matching the peaks that correspond with one another.

Figure 7A:
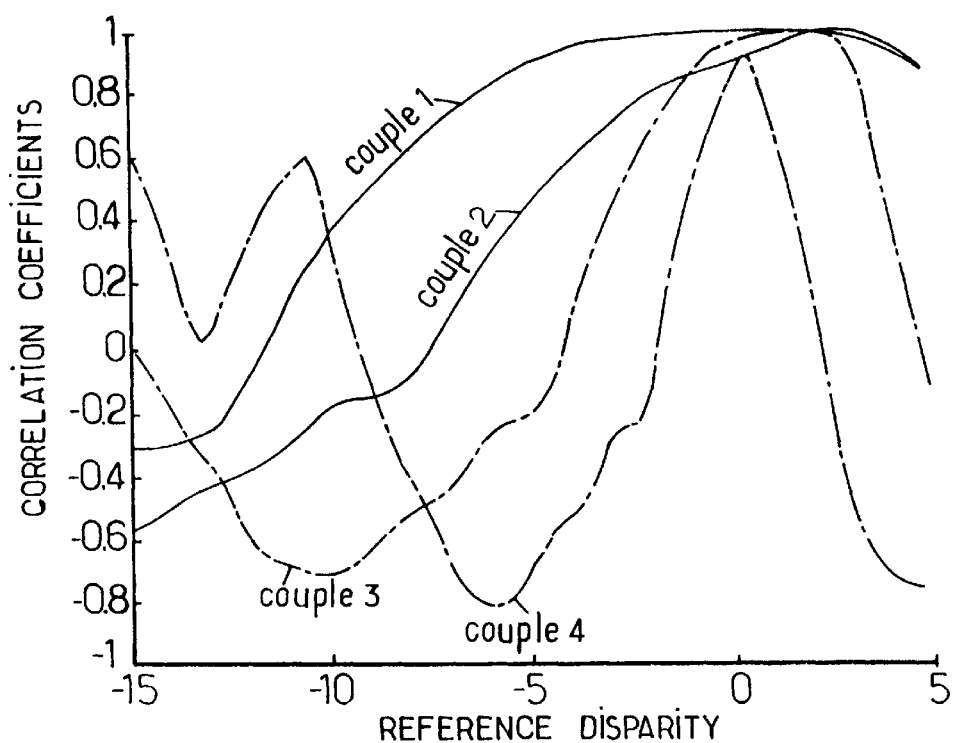
FIGS. 7A and 7B, which show resemblance curves as a function of disparity, show the benefit of curve selection.
Figure 7B:
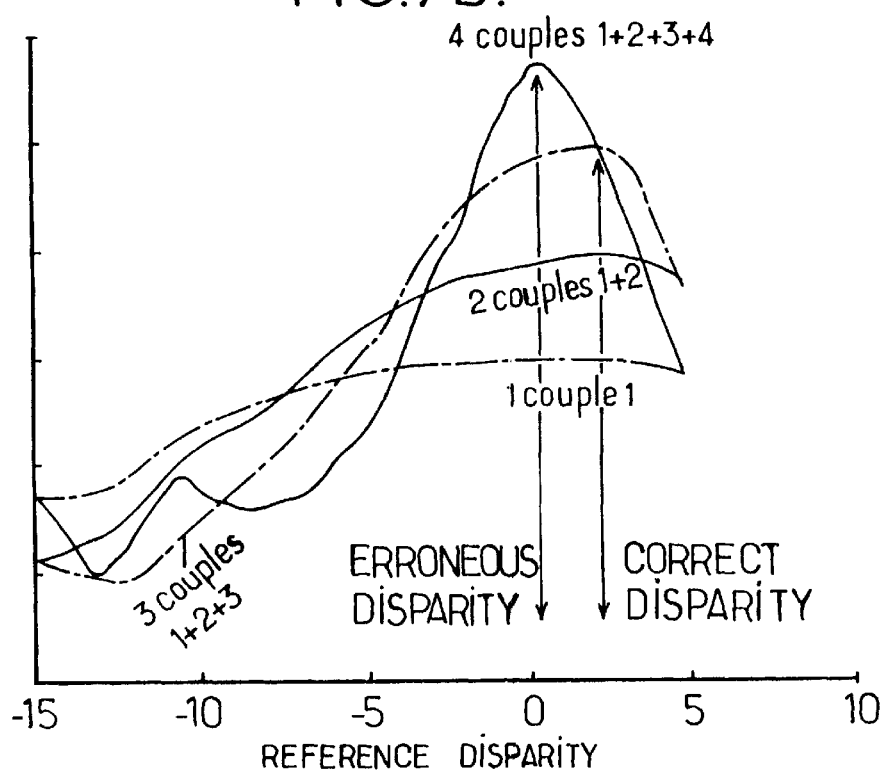

During the matching, it is expedient to remove the peaks due to occultation of points in one of the images of the pair. As an example, FIG. 7B shows the resemblance curves as a function of the disparity for four pairs. The pixel in the reference image is masked on the other image in pair 4, which shows peaks for disparities where the other curves do not have a maximum. In this case, it is expedient to remove curve 4 to find the correct disparity for the masked pixel. This result may, in particular, be obtained by a majority vote.

We claim:

1. A method for producing three dimensional cartographic data of a scene from n two-dimensional images of the scene, n being an integer higher than 2, said images being delivered by n respective detectors seeing the scene from different points of view, comprising the steps of:
   a) calibrating each detector i among said detectors for estimating parameters identifying n models $F_i$ (x, y, z) each defining a relation between coordinates x, y, z of any point in the scene and coordinates (p, q)$_i$ of a projection of said any point in an image i among said n images;
   b) matching each of (n−1) couples of said images, each of said couples consisting of a same reference image selected among said n images, each match being made by searching an homolog of each of a plurality of pixels or zones constituting said reference image along a corresponding epipolar line of the other image of the couple;
   c) in each of said (n−1) couples of two images, each comprising one reference image, and for each pixel or each zone of the reference image, preparing a curve plotting a degree of similarity as a function of disparity along the epipolar line of the other image of the couple;
   d) bringing back all said curves into a common reference frame for matching a maximum number of said images;
   e) summing said curves and retaining a highest peak among all peaks of the curve resulting from the summation; and
   f) deriving the coordinates x, y, z of each point from the disparity of the retained peak and from the parameter of the n models $F_i$ (x, y, z).

2. Method according to claim 1, wherein, during step (a) said curves are brought to a common reference frame by an affine model.

3. Method according to claim 1, comprising, during step (c), a further step of discarding any peak of said curve which has a degree of disparity which is inconsistent with the disparities on all the other curves.

4. Method according to claim 1, wherein a plurality of matchings are carried out with different reference images among all said images.

5. Method according to claim 1, including the step of combining results of matching between couples with a majority vote.

6. Method according to claim 5, wherein said majority vote is carried out while assigning a weighting coefficient which is higher for those peaks which correspond to points of view which are most remote from the reference image.

* * * * *